US008490997B2

(12) United States Patent
Chiang

(10) Patent No.: US 8,490,997 B2
(45) Date of Patent: Jul. 23, 2013

(54) ADJUSTABLE SUPPORTER FOR FASTENING TO A HUB AXLE

(76) Inventor: Hai-Huan Chiang, Taoyuan County (TW)

( * ) Notice: Subject to any disclaimer, the term of this patent is extended or adjusted under 35 U.S.C. 154(b) by 180 days.

(21) Appl. No.: 13/253,943

(22) Filed: Oct. 5, 2011

(65) Prior Publication Data

US 2013/0001387 A1 Jan. 3, 2013

(30) Foreign Application Priority Data

Jul. 1, 2011 (TW) ............................ 100212153 U

(51) Int. Cl.
*B62J 9/00* (2006.01)

(52) U.S. Cl.
USPC .................. 280/288.4; 280/152.1; 280/152.2; 280/152.3; 224/422

(58) Field of Classification Search
USPC ............... 362/382, 396, 418, 431; 280/288.4, 280/152.1–152.3; 224/422; 301/124.2
See application file for complete search history.

(56) References Cited

U.S. PATENT DOCUMENTS

| | | | | |
|---|---|---|---|---|
| 5,112,071 | A * | 5/1992 | Jones | 280/152.3 |
| 6,209,858 | B1 * | 4/2001 | Fujii | 267/201 |
| 7,090,603 | B2 * | 8/2006 | Shahana et al. | 474/80 |
| 7,320,655 | B2 * | 1/2008 | Fukuda | 474/80 |
| 8,016,310 | B2 * | 9/2011 | Kylstra et al. | 280/250.1 |

* cited by examiner

*Primary Examiner* — Terrell McKinnon
*Assistant Examiner* — Michael McDuffie

(57) ABSTRACT

A supporter fastening to a hub axle of bicycle for supporting a fender or light is disclosed. The supporter includes a mount, two clipping pieces, a bolt and a connecting rod. The mount has a fixing hole for being penetrated by the hub axle and a first long hole for being penetrated by a screw to fasten to a rear fork end of the bicycle. The two clipping pieces are separately located on two opposite sides of the mount. The bolt is formed with a ring and a threaded rod. The bolt penetrates through the clipping pieces and the mount to fasten. One end of the connecting rod penetrates through and is fastened in the ring. The connecting rod is capable of being rotated at a desired angle by axially rotating the bolt.

5 Claims, 6 Drawing Sheets

21
22
12
10
201
13
70
70

ADJUSTABLE SUPPORTER FOR FASTENING TO A HUB AXLE

BACKGROUND OF THE INVENTION

1. Technical Field

The invention relates to bicycles, particularly to supporters fastening to hub axles for supporting an external device such as a fender or light.

2. Related Art

Bicycling has becoming an increasingly popular form of recreation as well as a means of transportation. Moreover, bicycling has become a very popular competitive sport for both amateurs and professionals. Many various types of bicycles appear in the markets, such as mountain bikes (MTB), folding bikes, road bikes, etc.

For the sake of lightening weight, most bikes for sports are not equipped with racks or fenders. Usually, a rack or fender is fastened to a rear fork end. However, widths of the rear fork ends of various bicycle frames are different. There is no supporter which can be fastened to rear fork ends with different widths. This is very inconvenient for users of bicycles.

SUMMARY OF THE INVENTION

An objective of the invention is to provide a supporter for fastening to a hub axle, which can be applied in all types of bicycles to support a fender, rack or light behind or over a rear wheel of bicycle.

Another objective of the invention is to provide a supporter for fastening to a hub axle, in which a using angle may be adjusted for various requirements.

To accomplish the above objectives, the supporter of the invention includes a mount, two clipping pieces, a bolt and a connecting rod. The mount has a fixing hole for being penetrated by the hub axle and a first long hole for being penetrated by a screw to fasten to a rear fork end of the bicycle. The two clipping pieces are separately located on two opposite sides of the mount. The bolt is formed with a ring and a threaded rod. The bolt penetrates through the clipping pieces and the mount to fasten. One end of the connecting rod penetrates through and is fastened in the ring. The connecting rod is capable of being rotated at a desired angle by axially rotating the bolt.

DETAILED DESCRIPTION OF THE INVENTION

Figure 1:
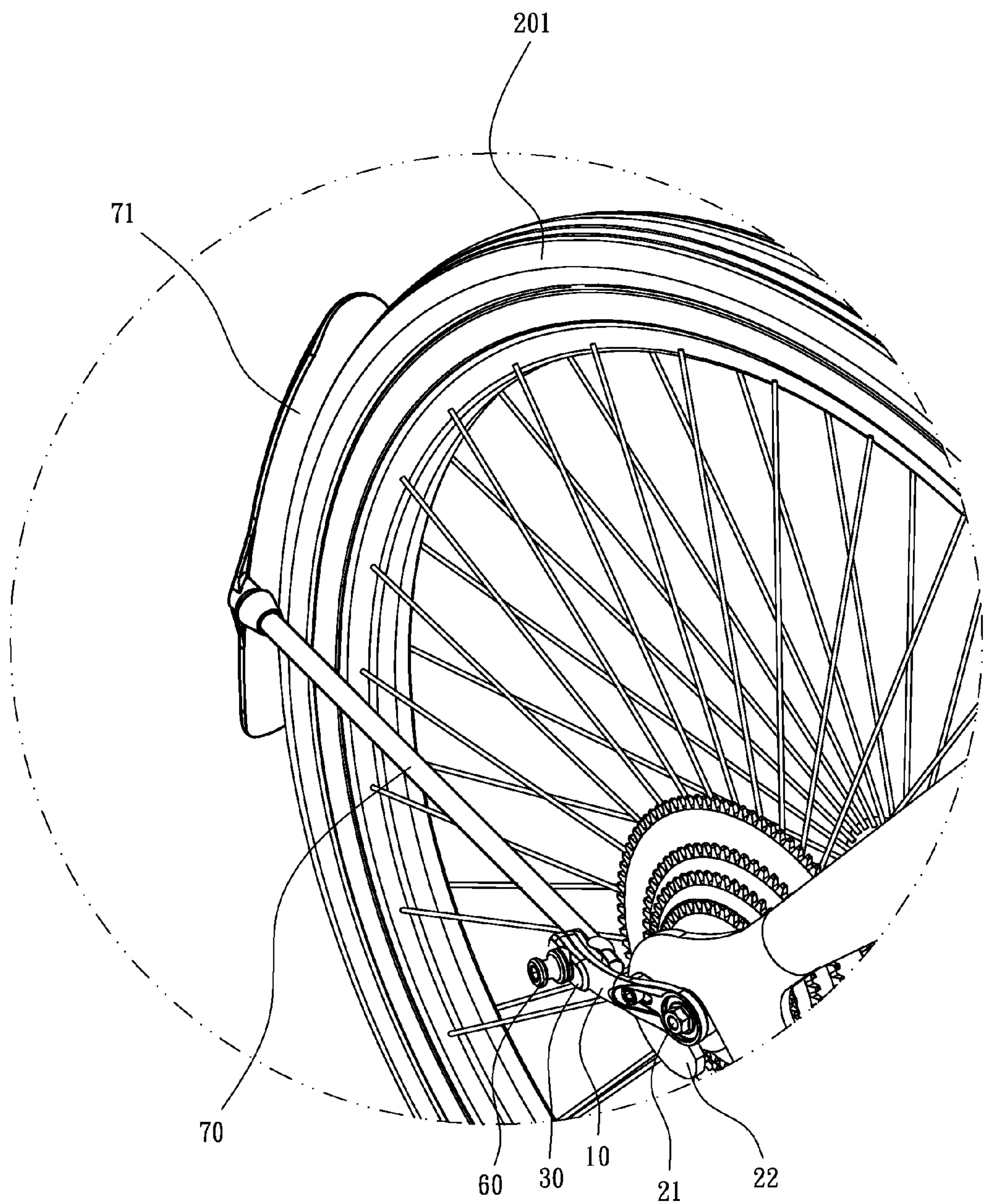
FIG. 1 is a schematic view showing the invention applied in a bicycle.
Figure 2:
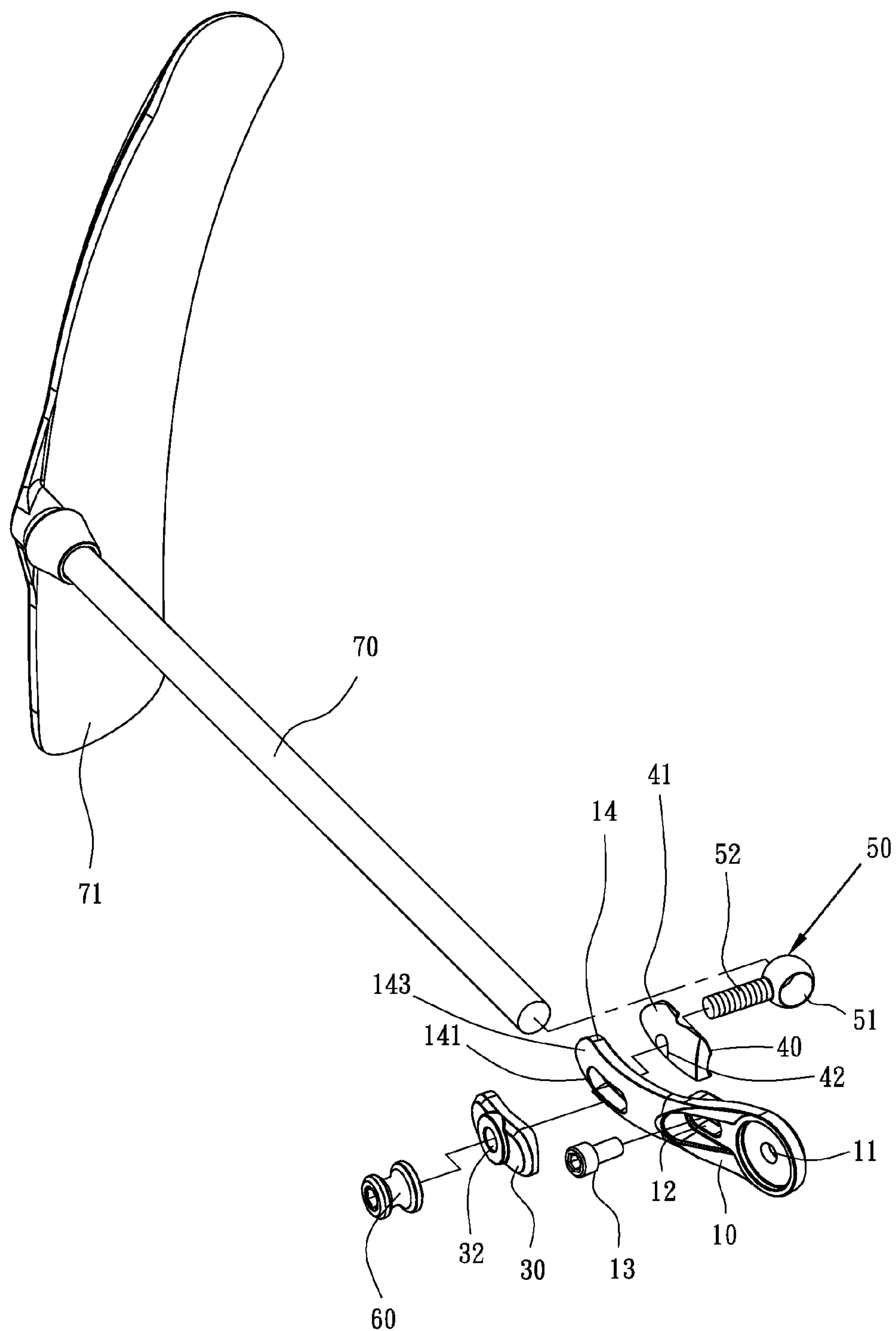
FIG. 2 is an exploded view of the invention.
Figure 3:
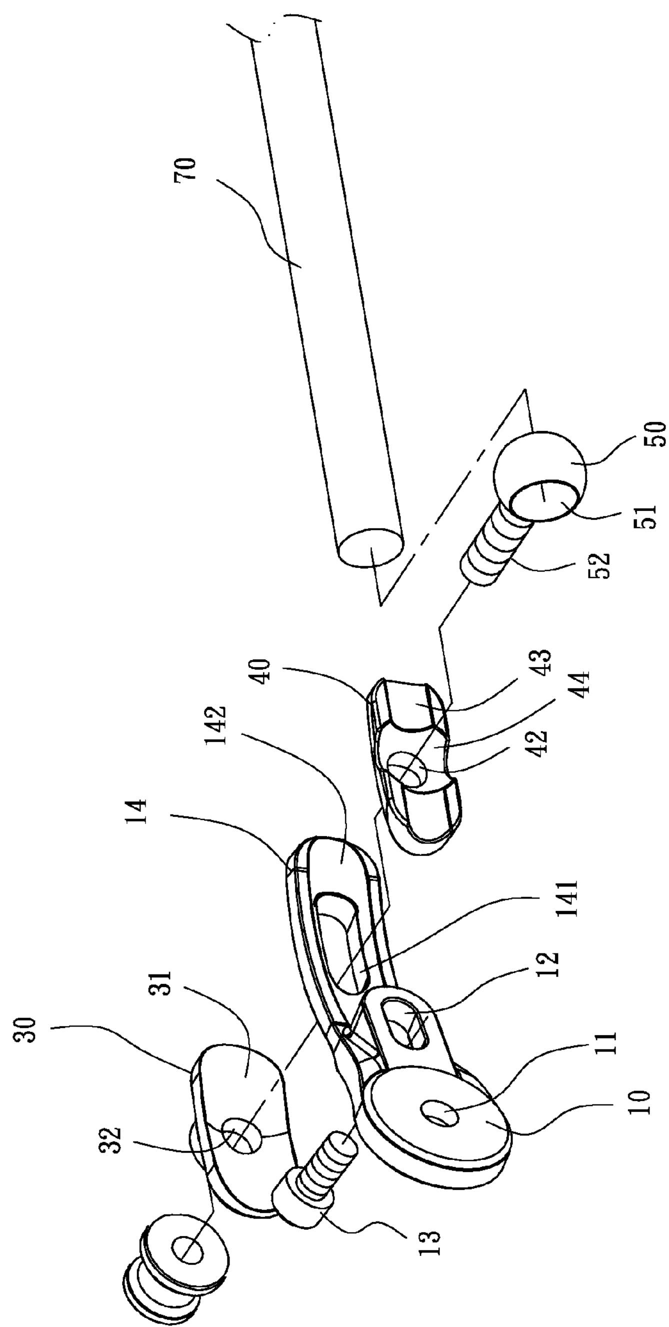
FIG. 3 is another exploded view of the invention.

Please refer to FIGS. 1-3. The adjustable supporter of the invention includes a mount 10, two clipping pieces 30, 40, a bolt 50 and a connecting rod 70.

The mount 10 is formed with a fixing hole 11 at one end thereof for being penetrated by an axle 21 of a hub 20 and a first long hole 12 at the center thereof for being penetrated by a screw 13 to fasten to a rear fork end 22 of a bicycle. The first long hole 12 allows the mount 10 to make a positional adjustment for matching different widths of rear fork ends of various bicycles. Fastening of the fixing hole 11 and first long hole 12 constitute two fixing points. The other end of the mount 10 is shaped into an arced bar 14 towards the tire 201 of the bicycle. A second long hole 141 is formed through the arced bar 14. A first concave surface 142 and a first convex surface 143 are formed on the inner side and the outer side of the arced bar 14, respectively.

The first clipping piece 30 and the second clipping piece 40 are formed with a second concave surface 31 and a second convex surface 41, respectively. The second concave surface 31 and the second convex surface 41 abut against the first convex surface 143 and the first concave surface 142 of the mount 10, respectively. The first clipping piece 30 and second clipping piece 40 has a first through hole 32 and a second through hole 42, respectively. The first clipping piece 30 and second clipping piece 40 are separately located on two opposite sides of the mount 10, and the first through hole 32 and the second through hole 42 overlap with the second long hole 141.

The bolt 50 is formed with a ring 51 and a threaded rod 52. The threaded rod 52 of the bolt 50 penetrates through the second through hole 42 of the second clipping piece 40, the second long hole 141 of the mount 10 and the first through hole 32 of the first clipping piece 30 to fasten the second clipping piece 40, the mount 10 and the first clipping piece 30.

One end of the connecting rod 70 may be used for fastening a fender 71 or any other proper devices such as a rack or light. The other end of the connecting rod 70 penetrates through and is fastened in the ring 51. The second clipping piece 40 is formed with a third concave surface 43 corresponding to the connecting rod 70 and a recess 44 corresponding to the bolt 50. The recess 44 is deeper than the third concave surface 43 so that the connecting rod 70 can be tightly fastened by the third concave surface 43 and the ring 51 when a nut 60 is screwed to the bolt 50.

Figure 4:
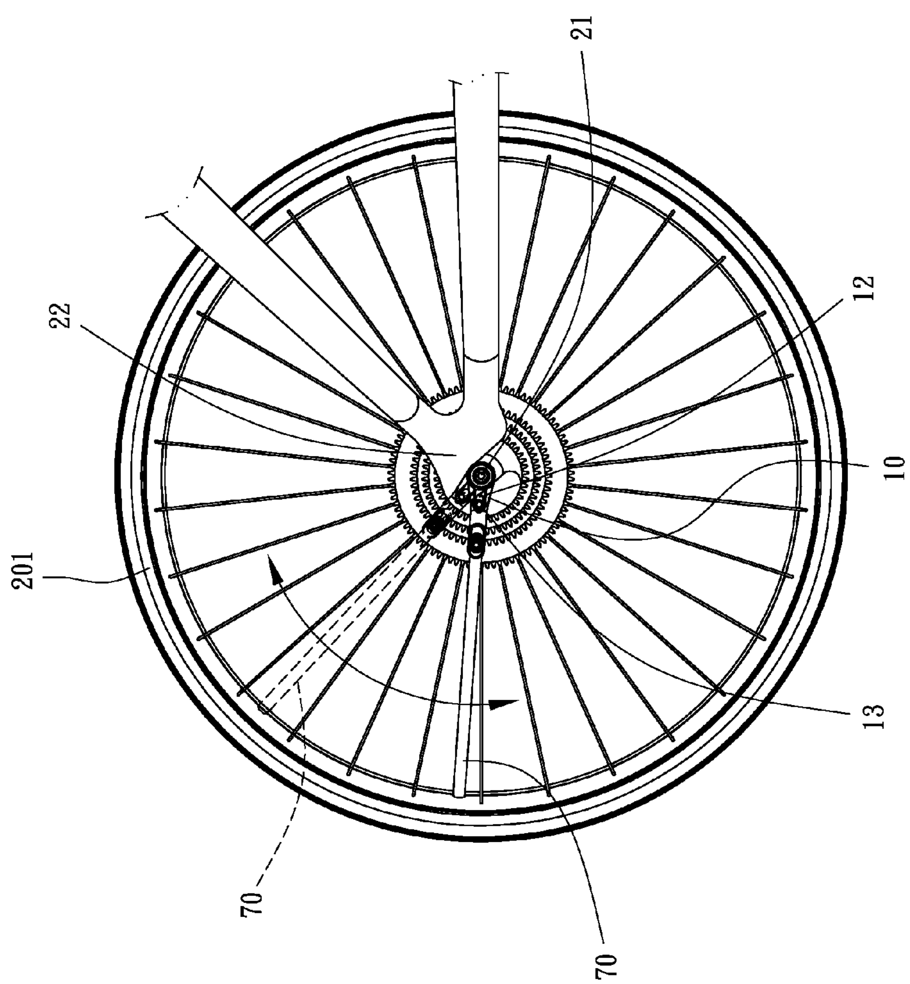
FIG. 4 is a schematic view showing the angular adjustment of the invention.
Figure 5:
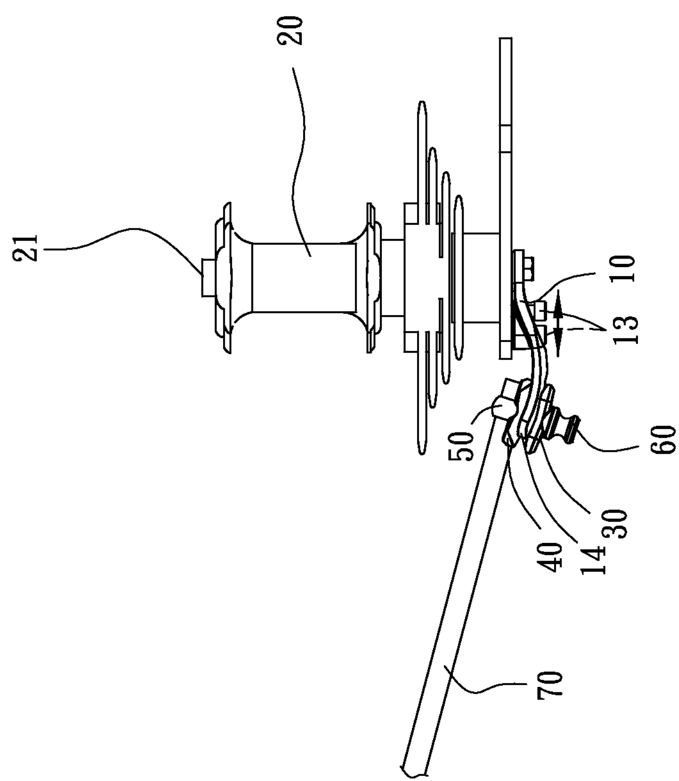
FIG. 5 is a schematic view showing the width adjustment of the invention.
Figure 6:
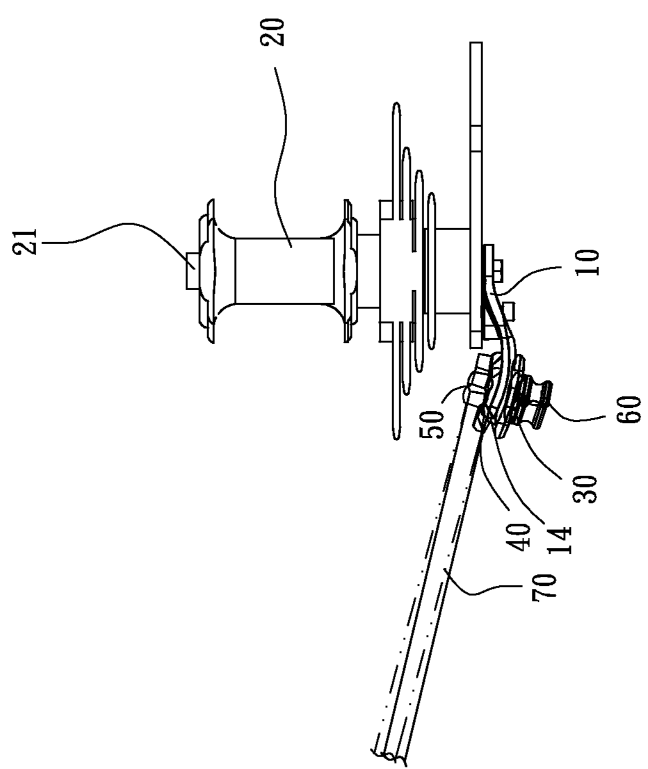
FIG. 6 is a schematic view showing the adjustment of the clipping pieces of the invention.

Please refer to FIGS. 4-6. To match various widths of rear fork ends, the mount 10 fastened to the axle 21 can be angularly adjusted, and the first long hole 12 allows the mount 10 to make an axial shift. When releasing the nut 60, connecting rod 70 can be slid in ring 51 of the bolt 50 to adjust its effective length. And the clipping pieces 30, 40 allow the connecting rod 70 to make a radial and axial adjustment within the range defined by the second long hole 141 and along the curve of the arced bar 14.

While the forgoing is directed to an embodiment of the present invention, other and further embodiments of the invention may be devised without departing from the basic scope thereof. As such, the appropriate scope of the invention is to be determined according to the claims.

What is claimed is:

1. An adjustable supporter for fastening to a hub axle of a bicycle, comprising:

a mount, having a fixing hole for being penetrated by the hub axle, a first long hole for being penetrated by a screw to fasten to a rear fork end of the bicycle and an arced bar with a second long hole;

a first clipping piece and a second clipping piece, having a first through hole and a second through hole respectively, wherein the first clipping piece and second clipping piece are separately located on two opposite sides of the mount, and the first through hole and the second through hole overlap with the second long hole;

a bolt formed with a ring and a threaded rod, wherein the bolt penetrates through the second through hole, the second long hole and the first through hole to fasten the second clipping piece, the mount and the first clipping piece; and a connecting rod, one end thereof penetrating through and being fastened in the ring, wherein the connecting rod is capable of being rotated at a desired angle by axially rotating the bolt.

2. The adjustable supporter of claim 1, wherein a first concave surface is formed on an inner side of the arced bar, the second clipping piece is formed with a second convex surface, and the second convex surface abuts against the first concave surface of the mount.

3. The adjustable supporter of claim 2, wherein a first convex surface is formed on an outer side of the arced bar, the first clipping piece is formed with a second concave surface, and the second concave surface abuts against the first convex surface of the mount.

4. The adjustable supporter of claim 1, wherein the second clipping piece is formed with a third concave surface corresponding to the connecting rod and a recess corresponding to the bolt, the recess is deeper than the third concave surface, so that the connecting rod is tightly fastened by the third concave surface and the ring.

5. The adjustable supporter of claim 1, wherein a nut is screwed to the bolt.

* * * * *